US010504542B2

(12) United States Patent
Li

(10) Patent No.: US 10,504,542 B2
(45) Date of Patent: *Dec. 10, 2019

(54) INCREASING STORAGE AREAL DENSITY USING PREDICTIVE DATA LOCATIONS

(71) Applicant: Alibaba Group Holding Limited, Grand Cayman (KY)

(72) Inventor: Shu Li, Santa Clara, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,934

(22) Filed: Jan. 7, 2019

(65) Prior Publication Data

US 2019/0304489 A1 Oct. 3, 2019

Related U.S. Application Data

(63) Continuation of application No. 15/940,038, filed on Mar. 29, 2018, now Pat. No. 10,176,829.

(51) Int. Cl.
*G11B 20/14* (2006.01)
*G11B 5/09* (2006.01)
*G11B 20/12* (2006.01)

(52) U.S. Cl.
CPC ............ *G11B 5/09* (2013.01); *G11B 20/1217* (2013.01); *G11B 20/1403* (2013.01); *G11B 2020/1238* (2013.01); *G11B 2020/1292* (2013.01)

(58) Field of Classification Search
CPC .................. G11B 5/09; G11B 20/1217; G11B 2020/1238; G11B 2020/1292; G11B 20/06; G11B 20/08; G11B 20/10268; G11B 27/36; G11B 20/1407; G11B 20/10; G11B 5/59633
USPC ......... 360/29, 31, 39, 41, 48, 49; 369/59.11, 369/59.25
See application file for complete search history.

(56) References Cited

U.S. PATENT DOCUMENTS

| | | | |
|---|---|---|---|
| 4,486,739 A | 12/1984 | Franaszek et al. |
| 4,488,143 A | 12/1984 | Martin |
| 4,979,185 A | 12/1990 | Bryans et al. |
| 6,356,215 B1 | 3/2002 | Coene |
| 6,959,412 B2 | 10/2005 | Silvus et al. |
| 7,038,600 B2 | 5/2006 | Coene et al. |
| 7,174,485 B2 | 2/2007 | Silvus |
| 7,469,049 B1 | 12/2008 | Feng |
| 7,530,003 B2 | 5/2009 | Lee et al. |
| 7,697,685 B1 | 4/2010 | Feng |
| 2004/0161113 A1 | 8/2004 | Coene et al. |
| 2005/0138522 A1 | 6/2005 | Silvus |
| 2011/0304936 A1 | 12/2011 | Nakagawa |

(Continued)

FOREIGN PATENT DOCUMENTS

WO 2002015185 A1 2/2002

*Primary Examiner* — Nabil Z Hindi
(74) *Attorney, Agent, or Firm* — James J. DeCarlo; Greenberg Traurig, LLP

(57) ABSTRACT

Disclosed are systems, methods, and devices for increasing the storage areal density of a storage device. In one embodiment, a method is disclosed comprising receiving host data, the host data including first data and extra bit data; generating run-length limited (RLL) data by encoding the first data with an RLL encoder; generating a symbol corresponding to at least one bit of the extra bit data; and generating superpositioned data by inserting the symbol within a contiguous section of repeating bits in the RLL-encoded first data.

32 Claims, 7 Drawing Sheets

(56) References Cited

U.S. PATENT DOCUMENTS

2016/0365112 A1 12/2016 Cai et al.
2017/0236534 A1 8/2017 Liu et al.

INCREASING STORAGE AREAL DENSITY USING PREDICTIVE DATA LOCATIONS

CROSS-REFERENCE TO RELATED APPLICATION

This patent application claims the benefit of and is a continuation of U.S. patent application Ser. No. 15/940,038, filed Mar. 29, 2018, entitled INCREASING STORAGE AREAL DENSITY USING PREDICTIVE DATA LOCATIONS, which is incorporated by reference herein in its entirety.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

Currently, a number of technologies have been proposed to increase the storage areal density of storage devices such as hard disk drives. One example of such technologies is heat-assisted magnetic recording (HAMR). In traditional storage devices, the minimum size of a magnetic field limits the amount of data stored in a given magnetic storage device. Thus, the regions of the hard disk storage used to store data may only be decreased while the magnetic fields are capable of supporting data writes. HAMR attempts to remedy this physical limitation by briefly heating the disk surface during writing which results in smaller magnetic fields achievable and, thus, smaller bit surfaces.

Another technique to increase storage areal density is bit-patterned media (BPM). Using BPM, data is stored in isolated magnetic islands as compared to existing techniques of storing bits of data using multiple magnetic grains. These magnetic islands are patterned using a precursor magnetic film (e.g., using nanolithography).

Both of these techniques over experimental improvements in storage areal density, however, they suffer from significant technical deficiencies. First, the underlying technologies in HAMR and BPM are currently experimental. Second, the existing techniques require fundamental changes to storage devices themselves. For example, HAMR requires a heating element to heat the magnetic surface temporarily. Thus, no existing storage devices can benefit from HAMR. BPM similarly requires modifications to the magnetic surface via nanolithography. Thus, current devices must be completely replaced. Third, the technical processes for implementing HAMR and BPM are complex, time-consuming, and expensive. The use of complex heating elements and nanolithography inherently increase the costs of manufacturing a given storage device. Fourth, as more data is stored using the above techniques, the quality of data is adversely affected due to noise resulting from the compacted data.

Another technique for increasing storage areal density in magnetic storage devices is shingled magnetic recording (SMR). In a conventional magnetic storage device, depicted in FIG. 7A, a given track is written to by a writer (also referred to as a "write head") that extends the entire height of the track. A reader (also referred to as a "read head") is thinner than the height of the track and reads from a portion of the track smaller than the height of the track. A guard space is situated between each track to avoid interference of the track magnetic fields.

In contrast, in SMR (illustrated in FIG. 7B) the tracks and the read portions overlap, forming a shingled pattern. The read head is appropriately reduced to handle the trimmed tracks. SMR, however, suffers from specific technical problems. First, SMR drive still cannot flexibly append extra bits with fixed sector size conventions. Applications needing to store extra bytes into each sector, however, and while SMR drives increase the areal density by removing the guard space among tracks and overlapping the tracks in the radial direction of the platters, the number of bits can be stored in one track keeps same as before. Second, SMR devices change conventional HDD operations. The concept of a trimmed track, or band, is introduced, and any modification in the band that is 128 or 256 MB requires the whole band to be read out and rewritten together. As a result, the random write performance of SMR is lower than that of a conventional drive. Third, SMR management is based on the unit of a trimmed track or band. When each sector varies its size individually, it causes many varieties for the band. This variation is complex to handle using existing SMR techniques.

Thus, there currently exists a need in the art to increase the storage areal density of a storage device without incurring the technical deficiencies in more experimental technologies. In one embodiment, the disclosed embodiments additionally may be applied to SMR drives as well as conventional drives.

SUMMARY

The disclosed embodiments relate to storage devices and, in particular, to systems and methods for increasing the areal density of storage devices (such as hard disk drives) using bit modulation.

The disclosed embodiments describe methods, circuits, devices, and systems for increasing the storage areal density of a storage device (e.g., a magnetic storage device).

The disclosed embodiments provide a technical improvement to existing storage devices that exploit current encoding strategies of storage devices. Specifically, the disclosed embodiments modify the run-length limited (RLL) encoded data to be written to a storage device to insert additional data, thus increasing the amount of data capable of being stored on an existing storage device. In one embodiment, the disclosed embodiments analyze an RLL-encoded data stream to identify candidate "runs" of repeated digits (e.g., a sequence of repeated zeros encoded using an RLL encoder). The disclosed embodiments modulate additional symbols in these runs. Thus, the outputted data stream, while violating the RLL requirements, includes additional symbol data. During decoding, the disclosed embodiments extract the modulated symbols and reconstruct the runs of digits to re-create the original RLL-encoded data string.

In one embodiment, a method is disclosed comprising receiving host data, the host data including first data and extra bit data; generating run-length limited (RLL) data by encoding the first data with an RLL encoder; generating a symbol corresponding to at least one bit of the extra bit data; and generating superpositioned data by inserting the symbol within a contiguous section of repeating bits in the RLL-encoded first data.

In another embodiment, a device is disclosed comprising a processor; and a storage medium for tangibly storing thereon program logic for execution by the processor, the stored program logic comprising: logic, executed by the processor, for receiving host data, the host data including first data and extra bit data; logic, executed by the processor, for generating run-length limited (RLL) data by encoding the first data with an RLL encoder; logic, executed by the processor, for generating a symbol corresponding to at least one bit of the extra bit data; and logic, executed by the processor, for generating superpositioned data by inserting the symbol within a contiguous section of repeating bits in the RLL-encoded first data.

In another embodiment, a system is disclosed comprising a processor; a persistent storage device; and a controller configured to access the persistent storage device in response to read and write commands issued by the processor, the controller configured to: receive host data, the host data including first data and extra bit data; generate run-length limited (RLL) data by encoding the first data with an RLL encoder; generate a symbol corresponding to at least one bit of the extra bit data; and generate superpositioned data by inserting the symbol within a contiguous section of repeating bits in the RLL-encoded first data.

As will be described in more detail, the disclosed embodiments increase storage capacity of existing storage devices. By manipulating the existing encoding schemes of storage devices, the disclosed embodiments do not require modification of the underlying storage device and can be applied to any existing storage device that utilizes RLL encoding.

BRIEF DESCRIPTION OF THE DRAWINGS

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
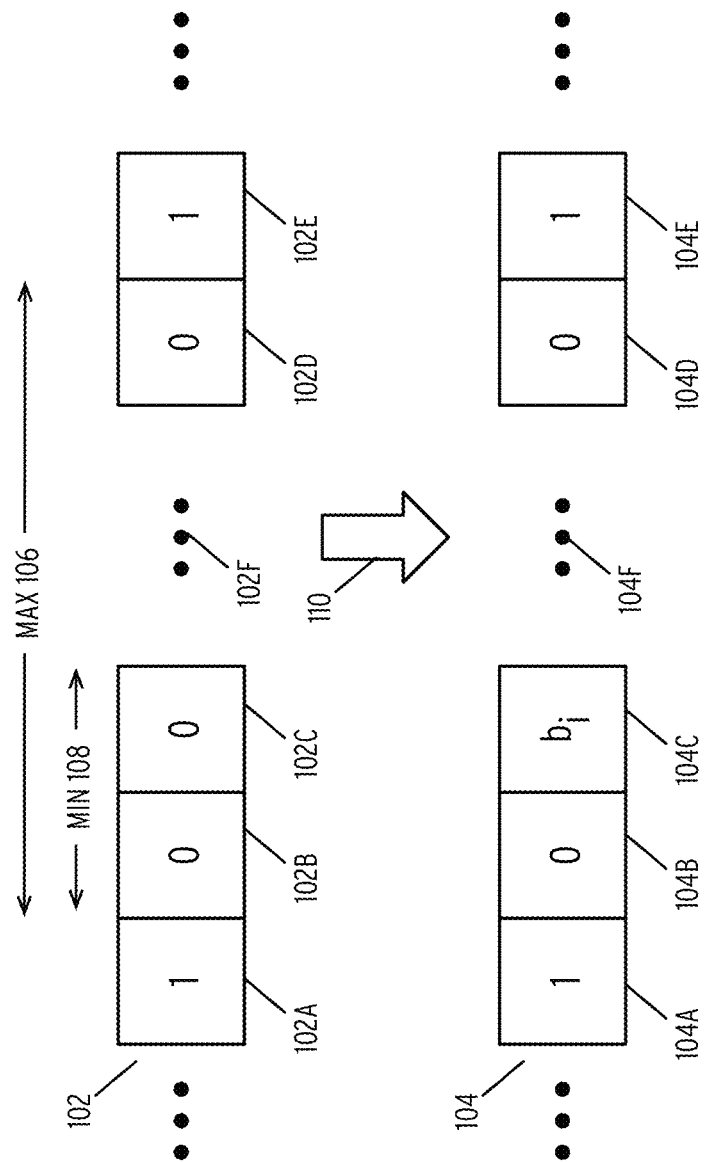
FIG. 1 is a diagram of a data stream utilizing a superpositioned bit pattern according to some embodiments of the disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

FIG. 1 is a diagram of a data stream utilizing a superpositioned bit pattern according to some embodiments of the disclosure.

In the illustrated embodiment, bitstream (102) represents an original bitstream including original bits (102A through 102E). In one embodiment, the bitstream (102) comprises a run-length limited (RLL) bitstream. The RLL bitstream ensures that the number of repeated bits is between set limits (e.g., repeated bits 102B, 102C, 102F, and 102D; as illustrated, bits 102F represent zero bits). The details of RLL encoding and decoding are described more fully in the description of FIG. 3, incorporated herein by reference in its entirety.

As illustrated in FIG. 1, bitstream (102) is encoded such that the number of repeated bits is between a minimum value (108) and a maximum value (106). In one embodiment, the minimum value may be three and the maximum value may be eight. This specific configuration is referred to as an RLL(3, 8) code.

As will be described more fully herein, the systems and methods receive the original bitstream (102) and generate a superpositioned bitstream (104). In the superpositioned bitstream (104), certain bits (e.g., 104A, 104E) are unchanged while other bits (e.g., 104C) include additional information not present in the original bitstream (102).

In one embodiment, this additional information may include metadata regarding the bitstream (102). For example, metadata may include a filesystem type, a file type, a size of the data in the bitstream, various flags used by the storage device, and any metadata regarding the bitstream. In one embodiment, the bitstream (102) may represent a continuous block of data to be written to a disk (e.g., representing a file) and the metadata may provide additional details regarding this block of data used by applications accessing the data.

In order to determine the value of the superpositioned bit (104C) as well as where in the bitstream (102) to insert the superpositioned bit (104C), various rules are employed to calculate the bit and position. These rules will be discussed in the example illustrated in FIG. 2 as well as the remaining Figures.

Figure 2:
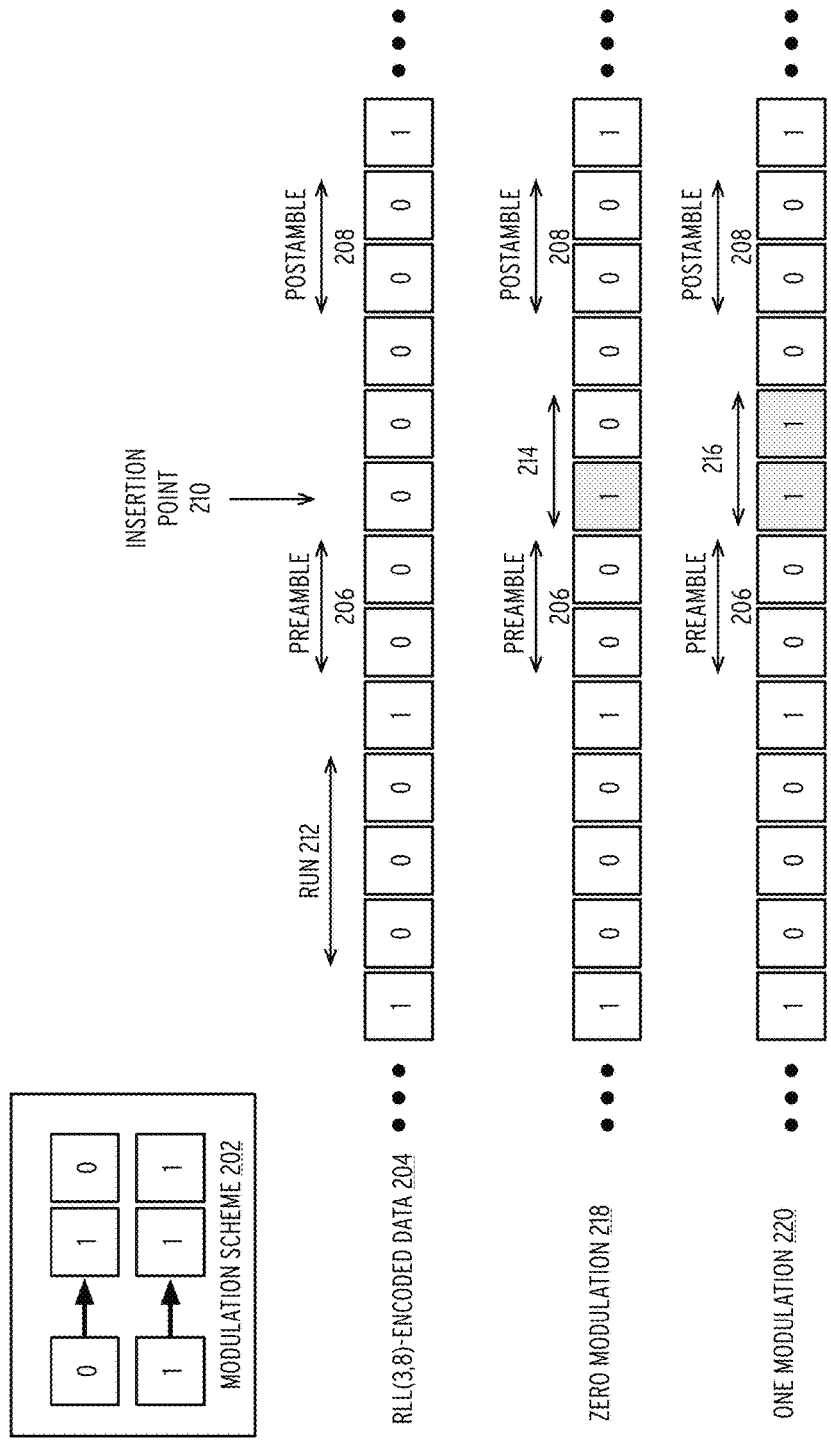
FIG. 2 is a diagram of a data stream utilizing a superpositioned bit pattern in an RLL(3, 8) encoding scheme according to some embodiments of the disclosure.

FIG. 2 is a diagram of a data stream utilizing a superpositioned bit pattern in an RLL(3, 8) encoding scheme according to some embodiments of the disclosure.

In the illustrated embodiment, a modulation scheme (202) is illustrated whereby a data bit "0" is represented by the symbol "10" and the data bit "1" is represented by the symbol "11." The modulation scheme is not intended to be limited, and other modulation schemes may be utilized subject to the requirements of the superpositioning procedures described herein.

FIG. 2 illustrates an RLL(3, 8) encoded data stream (204). In the stream (204), a run of six zeros appear beginning at preamble (206) and ending with postamble (208). As will be described in more detail, the systems and methods identify runs of repeated bits that are capable of being split into two small zero strings with a length of one or two (i.e., the preamble (206) and postamble (208)). The disclosed embodiments then attempt to insert superpositioned data in between the preamble (206) and postamble (208) portions. In some embodiments, a preamble (206) is required while a postamble (208) is not required.

As illustrated, the stream (204) includes a run of zeros (212). This run (212) meets the requirements of the disclosed embodiments as it may be partitioned into two strings of zeros (e.g., a 1-bit string and a 2-bit string). However, this partitioning results in no remaining bits for superpositioning. Additionally, creating a 1-bit preamble and 1-bit postamble would result in a single bit in the run (212) being available. Under the modulation scheme (202), two bits are required to superposition additional bits. Thus, run (212) is discarded during a pre-processing stage. In one embodiment, using an RLL(3, 8) code, the disclosed embodiments may simply only identify runs of zeros that are six or eight bits long.

As illustrated, three bits between preamble (206) and postamble (208) are available for superpositioning. Further, an insertion point (210) is illustrated as the first bit after the preamble. Superpositioned data is inserted at the insertion point (210).

FIG. 2 illustrates a zero modulation stream (218). In this stream (218), a bit of information comprising a zero bit is inserted into the original stream (204) at the insertion point (210). As illustrated, the symbol "10" (214) is inserted at the insertion point (210).

FIG. 2 illustrates a one modulation stream (220). In this stream (220), a bit of information comprising a one bit is inserted into the original stream (204) at insertion point (210). As illustrated, the symbol "11" (216) is inserted at the insertion point (210).

As will be described in more detail herein, the resulting preamble portion in the streams (218, 220) results in an invalid RLL(3, 8)-encoded stream. The presence of this invalid sequence is used to extract the inserted bits (214, 216) from the superpositioned streams, as will be discussed in more detail herein.

Figure 3:
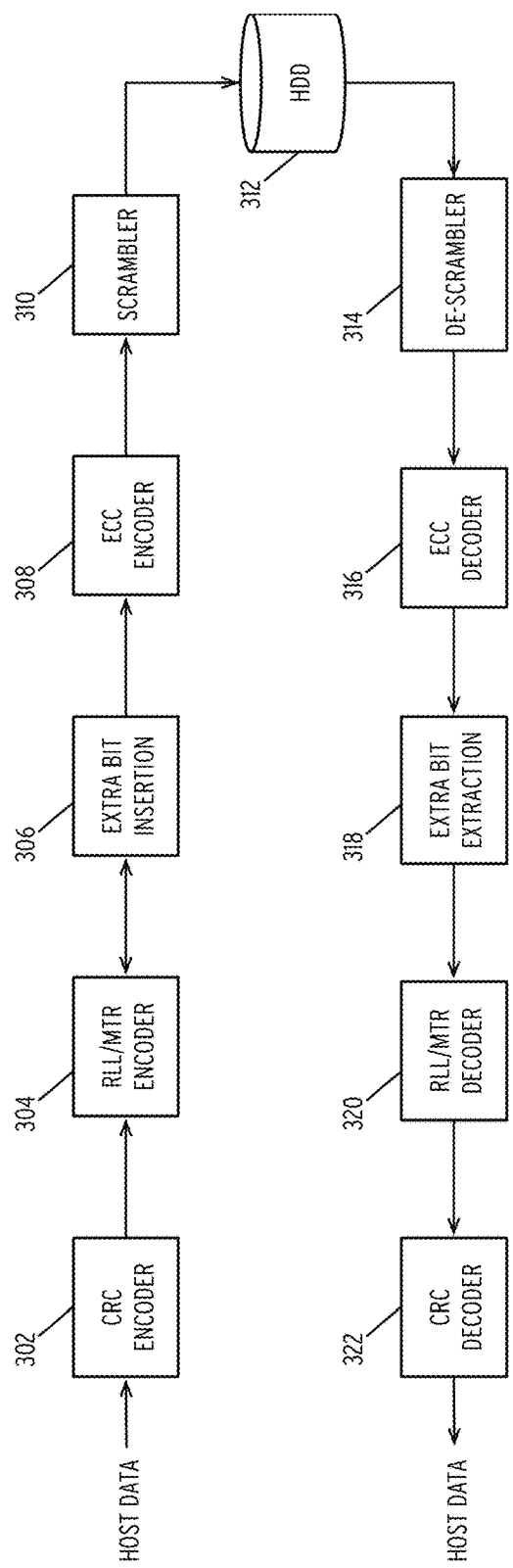
FIG. 3 is a functional block diagram illustrating a device for superpositioning extra bits in a run-length limited data stream according to some embodiments of the disclosure.

FIG. 3 is a functional block diagram illustrating a device for superpositioning extra bits in a run-length limited data stream according to some embodiments of the disclosure.

Figure 4:
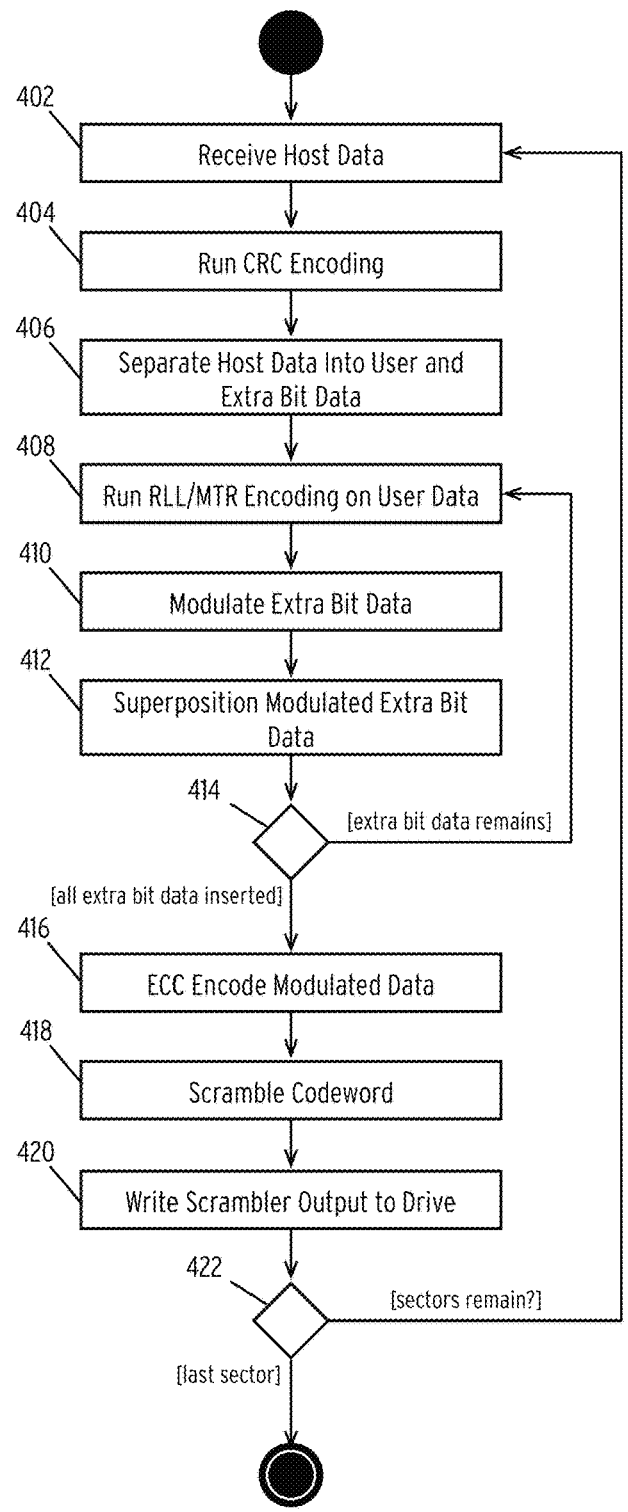
FIG. 4 is a flow diagram illustrating a method for superpositioning extra bits in a run-length limited data stream according to some embodiments of the disclosure.
Figure 5:
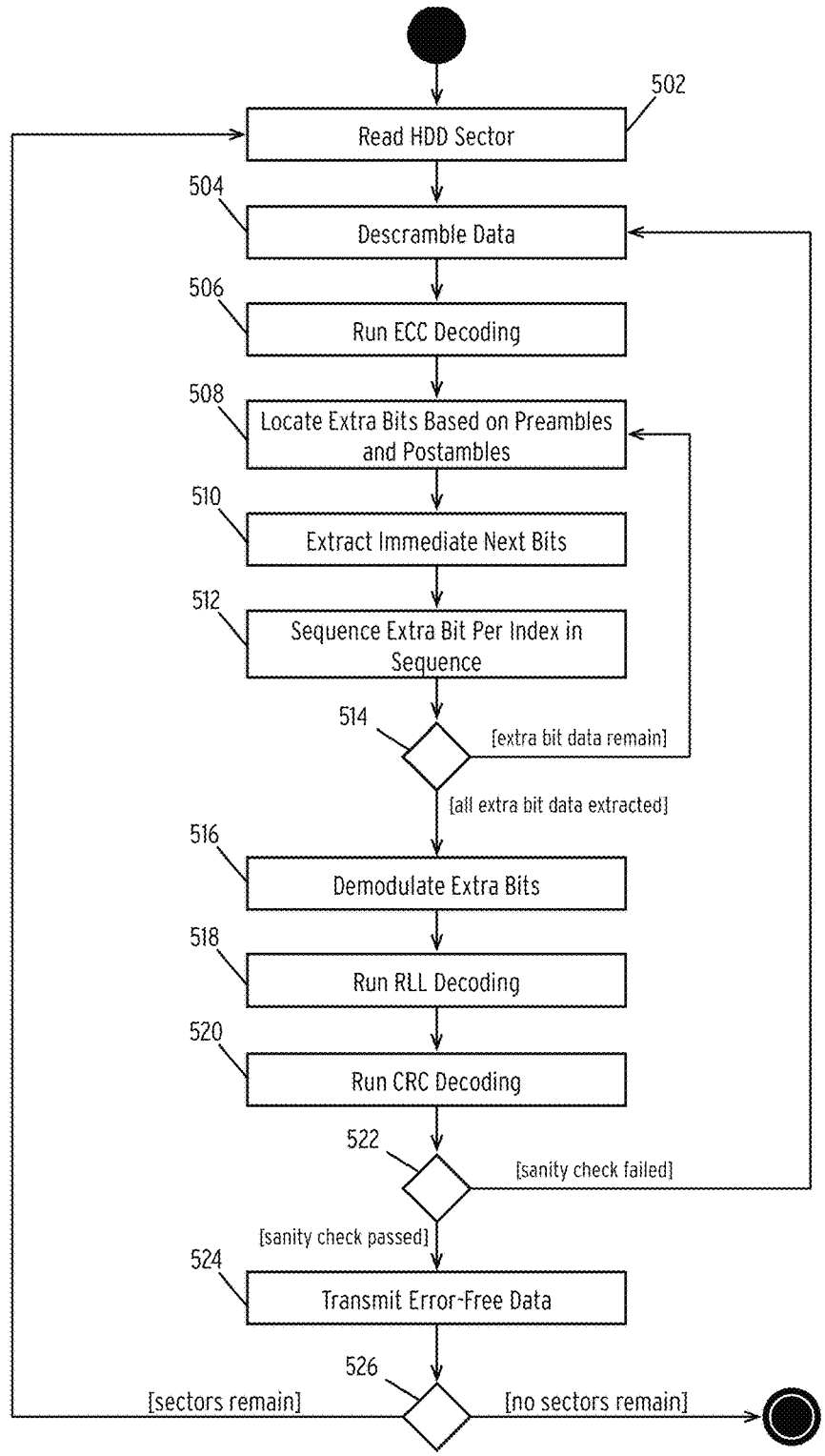
FIG. 5 is a flow diagram illustrating a method for extracting superpositioned extra bits in a run-length limited data stream according to some embodiments of the disclosure.

Specific functions of each unit depicted in FIG. 3 are described more fully in the descriptions of FIGS. 4 and 5. Specifically, the operation of units 302, 304, 306, 308, 310, and 312 are described in the description of FIG. 4 and the operation of units 310, 312, 314, 316, 320, and 322 are described in the description of FIG. 5. The specific description of FIGS. 4 and 5 is incorporated by reference in its entirety.

The device in FIG. 3 receives host data to be written to hard disk drive (HDD) (312). The host data comprises user data (also referred to as first data) and, in some embodiments, extra bit data. In one embodiment, the host data may be received from applications of a computing device or similar device. The specific information represented by the host data is not intended to be limiting. However, as will be further discussed, the host data may include both data to be written (user data) and extra bit data. This extra bit data may comprise metadata describing the user data but may comprise any information beyond the information encoded in the user data. In one embodiment, user data comprises any data to be stored on the underlying storage device. For example, user data may comprise application data, system-level data, or generally any data generated by a processing device for storage, regardless of the underlying source of the data.

The device includes a cyclical redundancy check (CRC) encoder (302). In some embodiments, the CRC encoder (302) may be implemented as a circuit or may be implemented as software. In some embodiments, the CRC encoder may comprise a programmable logic device or similar processing element. The choice of a cyclic error-correcting code used by the CRC encoding is not limiting on the disclosed embodiments. In one embodiment, the method uses a CRC-32 algorithm. In all embodiments, the output of the CRC encoder (302) is a codeword comprising the user bits one or more CRC bits. Thus, after CRC encoding, the codeword includes an additional portion storing the redundancy bits.

The CRC-encoded data is transmitted to, and received by, an RLL/maximum transition run (MTR) encoder (304). In one embodiment, the device may choose either an RLL or MTR encoder; the specific choice is not intended to be limiting. In general, the RLL/MTR encoder (304) encodes the user data portion of the host data to limit the number of sequential zero bits of the underlying user data. In some embodiments, the RLL/MTR encoder (304) may alternatively limit the number of one bits in the underlying user data. The resulting output of the RLL/MTR encoder (304) is transmitted to, and received by, an extra bit insertion unit (306).

The extra bit insertion unit (304) is configured to perform steps 408 through 414 described in the description of FIG. 4, the description hereby incorporated by reference in its entirety. In general, the extra bit insertion unit (304) receives the RLL/MTR-encoded data and the extra bit data included in the host data. The extra bit insertion unit (304) scans the RLL/MTR-encoded data and identifies candidate sequences or runs of repeated bits in the RLL/MTR-encoded data. The extra bit insertion unit (304) additionally modulates each bit of the extra bit data into a symbol (e.g., a two-bit symbol) using a set of defined modulation rules (as illustrated in FIG. 2). The extra bit insertion unit (304) repeatedly inserts symbols into all available runs of repeated bits until all extra bit data is inserted. The extra bit insertion unit (304) may additionally transmit the superpositioned data to the RLL/MTR encoder (304) for further encoding if no runs of sequential bits can be identified. After superpositioning the symbols, the extra bit insertion unit (304) transmits the superpositioned data to error-code correction (ECC) encoder (308).

The ECC encoder (308) generates a parity checked codeword to ensure the integrity of the data during subsequent reads. In one embodiment, the ECC encoding may be any form of ECC encoding such as a repetition code, parity code, checksum, CRC, or forward error correction (FEC) code. In some embodiments, the method may utilize an FEC to encode the superpositioned user data and may utilize, for example, a Turbo code, low-density parity check (LDPC) code, or similar code. In some embodiments, the encoding may be hard or soft encoding. The ECC encoder (308) transmits the ECC-encoded data to scrambler (310).

Scrambler (310) manipulates the ECC-encoded data to be written via any manipulation or selection that results in a known statistical distribution among the various states stored in the underlying storage medium. Scrambling methods include encryption-and linear feedback shift register (LFSR) techniques. In some embodiments, the encryption may comprise AES encryption. In some embodiments, the scrambling is more directly determined via the selection of one or more test patterns, providing a chosen statistical distribution of states when written to the underlying storage device. In general, the scrambling may be configured to ensure that the distribution of one and zero bits is evenly distributed on the underlying storage medium.

Finally, the scrambler (310) writes the scrambled data to the disk device (312). In one embodiment, writing the scrambled data comprises writing the data to a convention disk drive. In alternative embodiments, writing the scrambled data comprises writing the data to a shingled magnetic device.

The illustrated flow of data and operations performed by units 302, 304, 306, 308, 310, and 312 may be performed in response to a write command. Conversely, the flow of data and operations performed by units 312, 314, 316, 318, 320, and 322 may be performed in response to a read command.

FIG. 4 is a flow diagram illustrating a method for superpositioning extra bits in a run-length limited data stream according to some embodiments of the disclosure.

In step 402, the method receives host data.

In one embodiment, host data comprises user data to be written to a storage device, such as a hard disk drive. The method may receive host data via one or more applications running on a client device (e.g., an operating system or user-level applications). The method may receive host data as a bitstream of host data. The method may additionally receive host data as the result of a system call. In one embodiment, a hard disk drive controller implements the method illustrated in FIG. 4. As will be discussed in more detail, the host data may additionally include extra bit data (e.g., metadata) in addition to the user data. Thus, the host data may be represented as user data u and extra bit data e.

In step 404, the method runs CRC encoding on the host data.

In the illustrated embodiment, the method encodes both the user data and the extra bit data using a CRC encoding algorithm. In some embodiments, the method may use any CRC supported by the underlying storage device. The choice of a cyclic error-correcting code used by the CRC encoding is not limiting on the disclosed embodiments. In one embodiment, the method uses a CRC-32 algorithm. In all embodiments, the output of step 403 is a codeword comprising the user bits one or more CRC bits. Thus, after CRC encoding, the codeword includes an additional portion (c) storing the redundancy bits.

In step 406, the method separates the host data into user data and extra bit data. As described above, the host data includes user data (u) and extra bit data (e). The combined user and extra bit data are CRC-encoded, and in step 406, the method may simply segment the original data into user and extra bit data portion. Importantly, the segmentation of user and extra bit data facilitates the subsequent encoding procedures.

In step 408, the method runs RLL or MTR encoding on the user data.

In one embodiment, the RLL encoding comprises an RLL(3,8) encoding. As known in the art, by performing an RLL encoding on the user data, the method generates an RLL-encoded codeword. This codeword ensures that any continuous run of zeros is between three and eight bits long. In some embodiments, the method may alternatively use an MTR encoding rather than an RLL encoding.

In step 410, the method modulates extra bit data.

In one embodiment, when the method receives the host data, the host data includes user data and extra bit data. This extra bit data may comprise metadata describing aspects of the user data, or other information. In one embodiment, the method analyzes each bit of the extra bit data and modulates each bit. In one embodiment, the method modulates a 0 bit to the pattern 10 and a 1 bit to the pattern 11, as illustrated in FIG. 2. Alternative modulation schemes may be used.

In step 412, the method superpositions the modulated patterns or symbols into the RLL/MTR-encoded user data.

In one embodiment, the method scans the RLL-encoded data first to identify a consecutive run of zeros that meet predefined criteria. In one embodiment, the predefined criteria comprise a set of zeros establishing a preamble. For example, a preamble may be defined as two consecutive zeros followed by at least two other consecutive zeros. Alternatively, or in conjunction with the preceding, the criteria may additionally include two consecutive zeros forming a postamble. Thus, in one embodiment, the method may search for consecutive zero runs of between four and six bits. Alternatively, the method may search for any set of consecutive zeros exceeding four zeros.

Once the method identifies a candidate sequence of zeros, the method proceeds to insert the modulated symbols into the sequence. As described above, a modulated symbol may comprise a two-bit symbol. In one embodiment, the method may receive a set of symbols representing the extra bit data for insertion into the user data. In this embodiment, the method iterates through the run of zeros and inserts the symbols into the run of zeroes. In one embodiment, the method identifies the preamble portion and proceeds to insert two-bit symbols into the following zeros until either reaching the postamble or no zeroes remain.

Returning to FIG. 2, in step 412, the method first identifies the preamble (206) and begins inserting modulated symbols at the first available zero bit after the preamble (206). In the embodiment illustrated in FIG. 2, the method inserts a first symbol (214 or 216) at the first location after the preamble (206). The method then moves to the next available position (e.g., the bit before postamble (208)). In one embodiment (not illustrated), the method may insert another symbol at this position. In this embodiment, the symbol occupies the bit before the postamble (208) as well as the first bit of the postamble (208), leaving one remaining bit of the postamble (208).

In an alternative embodiment, after inserting the first symbol (214 or 216), the method determines that only three bits remain and two of these bits are reserved for a postamble (208). In this embodiment, the method may stop writing symbols to preserve the postamble.

In step 414, the method determines if any extra bit data remains to be inserted.

In one embodiment, the extra bit data comprises a sequence of bits (e.g., "10010011"). Each bit is modulated in step 410. Thus, in the previous example, the modulated symbols comprise "11", "10", "10", "11", "10", "10", "11" and "11." In step 412, the method operates on a single modulated symbol.

In step 414, after inserting the first modulated symbol (e.g., "11"). The method selects the next symbol and attempts to insert the next symbol(s) (e.g., symbol "10") in the user data. In one embodiment, the method inserts the next symbols in the same RLL run. In other embodiments, the method continues to scan the user data to identify another RLL run of zeros to insert the symbols. The method continues to scan through the user data to insert all the symbols of extra bit data.

In step 414 however, the method may reach the end of the user data before inserting each modulated symbol. In this scenario, the method re-executes steps 408 through 414 until all modulated bits are inserted. Specifically, in step 408, the method re-executes the RLL encoding on the user data that includes the modulated symbols. In this manner, the method generates a new candidate set of zero runs to insert modulated symbols into. After running the RRL encoding, the method proceeds to modulate the extra bit data (step 410) and insert the modulated symbols (step 412). In some embodiments, step 410 may be omitted for subsequent insertion loops, and extra bit data may only be modulated once.

In step 416, after all of the modulated symbols are inserted, the method performs ECC encoding on the user data that includes the modulated symbols.

As can be seen in the preceding description, user data of length L is received and encoded using RLL encoding to generate a vector of user data meeting the constraints of the RLL encoder. Since extra bit data is modulated and inserted into the runs of zeros generated by the RLL encoder, the length of the user data including the extra bit data remains of length L yet includes additional data in the form of the extra bit data, thus increasing the storage capacity of the underlying user data.

In one embodiment, the ECC encoding may be any form of ECC encoding such as a repetition code, parity code, checksum, CRC, or FEC code. In some embodiments, the method may utilize an FEC to encode the superpositioned user data and may utilize, for example, a Turbo code, LDPC code, or similar code. In some embodiments, the encoding may be hard or soft encoding.

In some embodiments, the selection of an ECC may be constrained based on the underlying storage device. Specifically, the steps above of superpositioning modulated extra bit data into user data may be incorporated into an existing storage device. In some embodiments, this storage device may utilize a hard-coded ECC protection scheme. In this embodiment, the method may simply utilize the ECC utilized by the storage device. In this manner, the method described above may be deployed to an existing storage device without further modification of the underlying storage device. In this manner, the aforementioned superpositioning technique may be used with any storage device.

In step 418, the method scrambles the ECC-encoded data.

In one embodiment, scrambling the ECC-encoded data comprises manipulating the ECC-encoded data to be written via any manipulation or selection that results in a known statistical distribution among the various states stored in the underlying storage medium. Scrambling methods include encryption-and LFSR techniques. In some embodiments, the encryption may comprise AES encryption. In some embodiments, the scrambling is more directly determined via the selection of one or more test patterns, providing a chosen statistical distribution of states when written to the underlying storage device. In general, the scrambling may be configured to ensure that the distribution of one and zero bits are evenly distributed on the underlying storage medium. The particular operation of ECC encoding and scrambling is not intended to be limited.

In step 420, the method writes the scrambled output to the storage device. In the illustrated embodiment, writing the scrambled output comprises manipulating the magnetic fields of an underlying magnetic storage device. In one embodiment, step 420 may be performed in a manner traditionally performed by a magnetic storage device and the specific details regarding the physical writing of data to a storage device is not expostulated upon in detail.

In step 422, the method determines if additional sectors remain to be written. If the method detects that the last sector has been written, the method ends. Alternatively, the method re-executes steps 402 through 422 until all received sectors have been written.

FIG. 5 is a flow diagram illustrating a method for extracting superpositioned extra bits in a run-length limited data stream according to some embodiments of the disclosure.

In step 502, the method reads a hard disk drive sector. In one embodiment, the sector may be received as part of a read command issued to a hard disk drive controller. In one embodiment, the command includes an identification of a sector (e.g., a sector ID).

In step 504, the method descrambles the sector data read in step 502. In one embodiment, step 504 comprises the inverse operation of step 418. Specifically, the method manipulates the scrambled data to reconstruct the codeword. This reconstruction is performed due to the reorganization of bits performed primarily due to the magnetic nature of the underlying storage device.

In step 506, the method runs ECC decoding on the descrambled sector data. In one embodiment, the ECC decoding may be any form of ECC decoding such as a repetition code, parity code, checksum, CRC, or FEC code. In some embodiments, the method may utilize an FEC to decode the superpositioned user data and may utilize, for example, a Turbo code, LDPC code, or similar code. In some embodiments, the encoding may be hard or soft decoding.

In some embodiments, the selection of an ECC may be constrained based on the underlying storage device. Specifically, the aforementioned steps of superpositioning modulated extra bit data into user data may be incorporated into an existing storage device. In some embodiments, this storage device may utilize a hard-coded ECC protection scheme. In this embodiment, the method may simply utilize the ECC utilized by the storage device. In this manner, the aforementioned method may be deployed to an existing storage device without further modification of the underlying storage device. In this manner, the aforementioned superpositioning technique may be used with any storage device.

In step 508, the method locates extra bits included in the sector data based on pre-defined preamble and postamble patterns.

As described above, the method utilizes pre-defined preamble and postamble patterns to identify sections of the returned data that may include modulated symbols. In one embodiment, a pre-defined preamble of postamble pattern may comprise a set length of repeating bits.

In one embodiment, the pre-defined patterns comprise an invalid sequence of repeating bits. For example, if using an RLL(3, 8) encoding, the pattern may comprise a one or two-bit repeating sequence of zeros. In one embodiment, this pattern is selected such that the pattern represents an invalid sequence given the underlying RLL encoding scheme. In some embodiments, the postamble may be chosen similarly. However, in some embodiments, the postamble may be one bit or may be excluded entirely.

In step 510, the method extracts an immediate next bit.

After identifying a preamble (e.g., an invalid bit sequence), the method extracts the immediate next bits. In one embodiment, the method extracts the next two bits after the preamble. In one embodiment, the method confirms that these two bits represent a modulated symbol.

In step 512, the method sequences the extra bit based on the index in the sequence. In one embodiment, the method orders the extract extra bits based on the extra bit's position in the returned data to reconstruct the original extra bit sequence.

In step 514, the method determines if all extra bit data has been extracted from the sector data. If not, the method re-executes steps 508, 510, and 512 until all extra bits have been extracted.

In step 516, the method demodulates the extra bits to generate the extra bit portion. As described in FIG. 2, demodulating the extra bits comprises converting the two-bit symbols into a single bit of extra data according to a pre-configured modulation scheme.

The following examples are provided to further clarify the above operations of steps 508, 510, and 512. In a first example, the data received in step 508 comprises "1000100100011" (illustrated in FIG. 2). This data includes three runs of zeros, "000", "00", and "000" both of which are valid RLL(3, 8) runs.

As illustrated, the first run "000" is a valid RLL(3, 8) run of zeros. Thus the method may ignore this run and move to the second and third runs ("00" and "000", respectively). Here, the method identifies the second run ("00") as an invalid bit sequence when using an RLL(3, 8) encoding. Thus, the method treats the second run as a preamble and selects the next bits ("10"). Since this bit pattern matches a known modulation scheme, the method demodulates the symbol to the value "0" (as illustrated in FIG. 2). Thus, the extra bit portion e is set to "1".

The method may then select the next two-bit pattern ("00"). The method confirms that this symbol does not match a modulation scheme and thus marks the bit pattern as a postamble portion. Finally, the method may "reset" the symbol bits as zeros to convert the superpositioned string to a valid RLL string "1000100000011."

The previous example illustrates the use of a two-bit preamble. The following example describes the use of a one-bit preamble.

In this example, the superpositioned string may comprise "1000100100111". Here, the method again skips the first run of "000" and identifies the second run ("00") as the preamble. Also, the method identifies the next two bits ("10") as a modulated symbol. The method then selects the next two bits "01" and determines that this symbol does not correspond to a known modulation pattern. Thus, the method treats the "0" portion of the final symbol as a postamble and ends the extraction, returning the RLL-encoded string "1000100000111."

The final example provided herein illustrates the operation of the method with no postamble. In this example, the received string may comprise "10001001010101111." Here, the method again identifies the second run ("00") as the preamble start. The method then selects pairs of bits until reaching the maximum run length. Here, the next three bit sequences "10", "10", and "10" are valid modulated symbols. However, upon reaching the last of these symbols, the maximum run length of eight is reached. Thus, if no postamble is used, the method may extract these symbols and generate the RLL-encoded codeword "10001000000001111."

In step 518, the method runs RLL/MTR decoding on the fully extracted sector data. In one embodiment, the RLL decoding comprises an RLL(3,8) decoding. In one embodiment, this is the inverse of the encoding performed in step 408.

In step 520, the method runs CRC decoding on the RLL/MTR-decoded data to verify the resulting data. In one embodiment, the RLL decoding comprises an RLL(3,8) decoding.

In step 522, the method determines if the CRC sanity check has passed. If the sanity check is not passed, the method re-executes steps 502-522 until the sanity check is passed. In one embodiment, determining if the CRC sanity check is passed comprises decoding the codeword using a CRC decoder inverse to the description of CRC encoding provided in step 404.

If the sanity check passes, the method transmits the error-free data to the host device in step 524. In one embodiment, the method transmits the data as a response to the read command received in step 502.

In step 526, the method determines if additional sectors remain to be read. If the method detects that all sectors have been read, the method ends. Alternatively, the method re-executes steps 502 through 526 until all sectors have been read.

Figure 6:
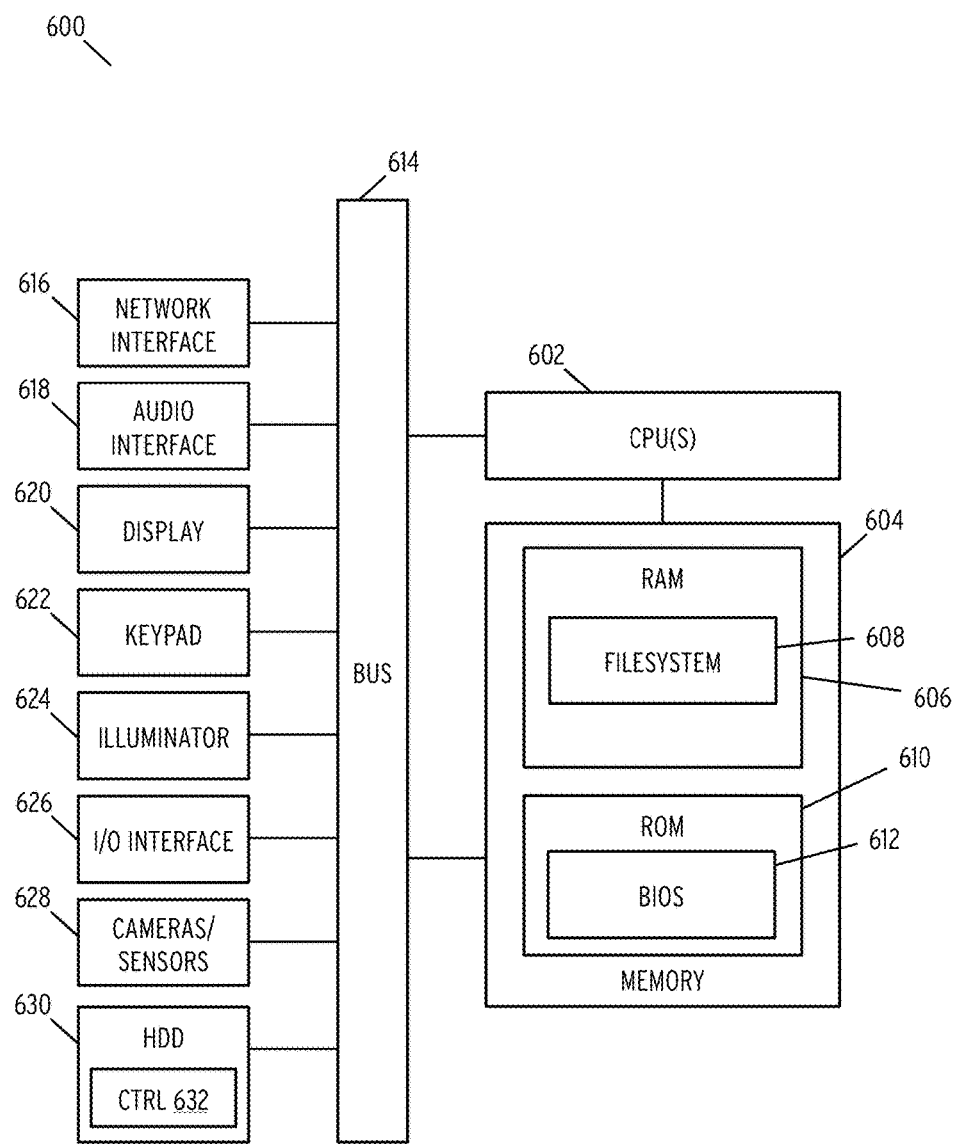
FIG. 6 is a block diagram of a device for superpositioning extra bits in a run-length limited data stream according to some embodiments of the disclosure.
Figure 7A:
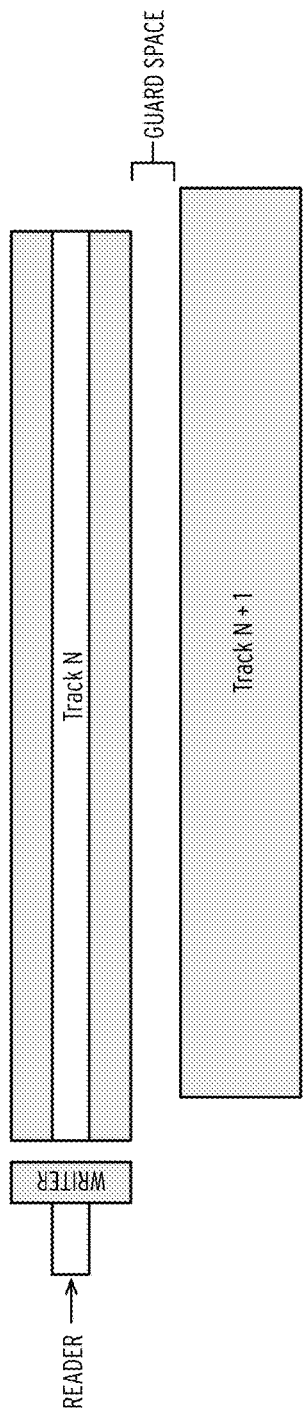
FIGS. 7A and 7B are diagrams of traditional write schemes and shingled magnetic recording (SMR) schemes, respectively, according to some embodiments of the disclosure.
Figure 7B:
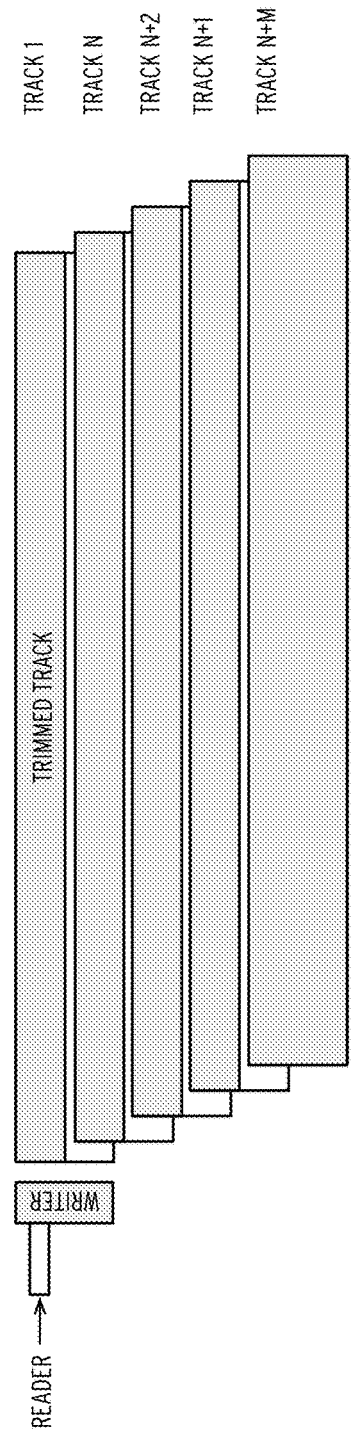

FIG. 6 is a block diagram of a device for superpositioning extra bits in a run-length limited data stream according to some embodiments of the disclosure.

System (600) may include many more or fewer components than those shown in FIG. 6. However, the components shown are sufficient to disclose an illustrative embodiment for implementing the present disclosure.

As shown in FIG. 6, system (600) includes a processing unit (CPU) (602) in communication with a mass memory (604) via a bus (614). System (600) also includes one or more network interfaces (616), an audio interface (618), a display (620), a keypad (622), an illuminator (624), an input/output interface (626), and a camera(s) or other optical, thermal or electromagnetic sensors (628). System (600) can include one camera/sensor (628), or a plurality of cameras/sensors (628), as understood by those of skill in the art.

System (600) may optionally communicate with a base station (not shown), or directly with another computing device. Network interface (616) includes circuitry for coupling system (600) to one or more networks and is constructed for use with one or more communication protocols and technologies. Network interface (616) is sometimes known as a transceiver, transceiving device, or network interface card (NIC).

Audio interface (618) is arranged to produce and receive audio signals such as the sound of a human voice. For example, audio interface (618) may be coupled to a speaker and microphone (not shown) to enable telecommunication with others and generate an audio acknowledgement for some action. Display (620) may be a liquid crystal display (LCD), gas plasma, light emitting diode (LED), or any other type of display used with a computing device. Display (620) may also include a touch sensitive screen arranged to receive input from an object such as a stylus or a digit from a human hand.

Keypad (622) may comprise any input device arranged to receive input from a user. For example, keypad (622) may include a push button numeric dial, or a keyboard. Keypad (622) may also include command buttons that are associated with selecting and sending images. Illuminator (624) may provide a status indication and provide light. Illuminator (624) may remain active for specific periods of time or in response to events. For example, when illuminator (624) is active, it may backlight the buttons on keypad (622) and stay on while the system is powered. Also, illuminator (624) may backlight these buttons in various patterns when particular actions are performed, such as dialing another system. Illuminator (624) may also cause light sources positioned within a transparent or translucent case of the system to illuminate in response to actions.

System (600) also comprises input/output interface (626) for communicating with external devices or other input or devices not shown in FIG. 6. Input/output interface (626) can utilize one or more communication technologies, such as USB, infrared, Bluetooth™, or the like.

Mass memory (604) includes a RAM (606), a ROM (610), and other storage means. Mass memory (604) illustrates another example of computer storage media for storage of information such as computer-readable instructions, data structures, program modules or other data. Mass memory (604) stores a basic input/output system ("BIOS") (612) for controlling low-level operation of the system (600). The mass memory may also store an operating system for controlling the operation of system (600). It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and operating system operations via Java application programs.

Memory (604) additionally includes a filesystem (608). In one embodiment, the filesystem (608) issues read and write commands, among other commands, to one or more hard disk drives (630). In some embodiments, the hard disk drives (630) may also include non-magnetic disk drives. The hard disk drive (630) additionally includes a controller (632). In one embodiment, the controller (632) is configured to encode the data included in commands issued by, for example, filesystem (608) for storage on the underlying physical storage medium of the hard disk drive (630). In the illustrated embodiment, the controller may perform some or all of the functions described in the preceding Figures. Alternatively, some or all of the functionality described above may be performed by application code stored in RAM (606) or ROM (610).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a processor, first data and second data;
   encoding, by the processor, the first data to generate encoded data;
   generating, by the processor, a symbol corresponding to the second data; and
   generating, by the processor, superpositioned data by inserting the symbol within the encoded data.

2. The method of claim 1, the receiving first data and second data comprising receiving the first data and second data as a bitstream.

3. The method of claim 1, the encoding the first data comprising encoding the first data such that the encoded data limits the length of any continuous run of zeros to be within a predefined range.

4. The method of claim 1, the encoding the first data comprising encoding the first data using a run-length limited (RLL) encoder.

5. The method of claim 1, the encoding the first data comprising encoding the first data using a maximum transition run (MTR) encoder.

6. An apparatus comprising:
   one or more processors; and
   a non-transitory memory storing computer-executable instructions therein that, when executed by the processor, cause the apparatus to perform the operations of:
   receiving first data and second data;
   encoding the first data to generate encoded data;
   generating a symbol corresponding to the second data; and
   generating superpositioned data by inserting the symbol within the encoded data.

7. The apparatus of claim 6, the receiving first data and second data comprising receiving the first data and second data as a bitstream.

8. The apparatus of claim 6, the encoding the first data comprising encoding the first data such that the encoded data limits the length of any continuous run of zeros to be within a predefined range.

9. The apparatus of claim 6, the encoding the first data comprising encoding the first data using a run-length limited (RLL) encoder.

10. The apparatus of claim 6, the encoding the first data comprising encoding the first data using a maximum transition run (MTR) encoder.

11. A method comprising:
    receiving, by a processor, data, the data including at least one codeword;
    locating, by the processor, extra bits included in the codeword using a pre-defined preamble pattern;
    demodulating, by the processor, the extra bits to generate an extra bit portion; and
    replacing, by the processor, the extra bits in the codeword with the extra bit portion to obtain a second codeword.

12. The method of claim 11, the receiving data comprising reading a hard disk drive sector storing the data.

13. The method of claim 11, further comprising descrambling the data to identify the codeword.

14. The method of claim 11, further comprising decoding the codeword using an error-code correction (ECC) code.

15. The method of claim 11, the locating the extra bits included in the codeword using the pre-defined preamble pattern further comprising locating the extra bits included in the codeword using the pre-defined postamble pattern.

16. The method of claim 11, the locating the extra bits included in the codeword using the pre-defined preamble pattern comprising identifying a repeating pattern of zeros in the codeword, the pattern of zeros representing an invalid sequence in the codeword.

17. The method of claim 11, the locating the extra bits included in the codeword using the pre-defined preamble pattern comprising extracting two bits after the preamble pattern.

18. The method of claim 11, further comprising sequencing the extra bits based on an index of the extra bits in a sequence.

19. The method of claim 11, the demodulating the extra bits to generate the extra bit portion comprising converting a two-bit sequence in the extra bits to a single bit.

20. The method of claim 11, further comprising decoding the second codeword using an encoder selected from the group consisting of a run-length limited (RLL) encoder and a maximum transition run (MTR) encoder.

21. The method of claim 20, further comprising performing, by the processor, a cyclical redundancy check (CRC) on the decoded second codeword.

22. An apparatus method comprising:
    one or more processors; and
    a non-transitory memory storing computer-executable instructions therein that, when executed by the processor, cause the apparatus to perform the operations of:
    receiving data, the data including at least one codeword;
    locating extra bits included in the codeword using a pre-defined preamble pattern;
    demodulating the extra bits to generate an extra bit portion; and replacing the extra bits in the codeword with the extra bit portion to obtain a second codeword.

23. The apparatus of claim 22, the receiving data comprising reading a hard disk drive sector storing the data.

24. The apparatus of claim 22, further comprising descrambling the data to identify the codeword.

25. The apparatus of claim 22, further comprising decoding the codeword using an error-code correction (ECC) code.

26. The apparatus of claim 22, the locating the extra bits included in the codeword using the pre-defined preamble pattern further comprising locating the extra bits included in the codeword using the pre-defined postamble pattern.

27. The apparatus of claim 22, the locating the extra bits included in the codeword using the pre-defined preamble pattern comprising identifying a repeating pattern of zeros in the codeword, the pattern of zeros representing an invalid sequence in the codeword.

28. The apparatus of claim 22, the locating the extra bits included in the codeword using the pre-defined preamble pattern comprising extracting two bits after the preamble pattern.

29. The apparatus of claim 22, further comprising sequencing the extra bits based on an index of the extra bits in a sequence.

30. The apparatus of claim 22, the demodulating the extra bits to generate the extra bit portion comprising converting a two-bit sequence in the extra bits to a single bit.

31. The apparatus of claim 22, the instructions further causing the apparatus to perform the operation of decoding the second codeword using an encoder selected from the group consisting of a run-length limited (RLL) encoder and a maximum transition run (MTR) encoder.

32. The apparatus of claim 31, the instructions further causing the apparatus to perform the operation of performing a cyclical redundancy check (CRC) on the decoded second codeword.

* * * * *